3,258,505
PURIFICATION OF A MOLTEN LITHIUM
SALT SYSTEM
George Stewart Mill, Pasadena, Tex., assignor to Shell
Oil Company, New York, N.Y., a corporation of Delaware
Filed July 30, 1964, Ser. No. 386,227
5 Claims. (Cl. 260—683.3)

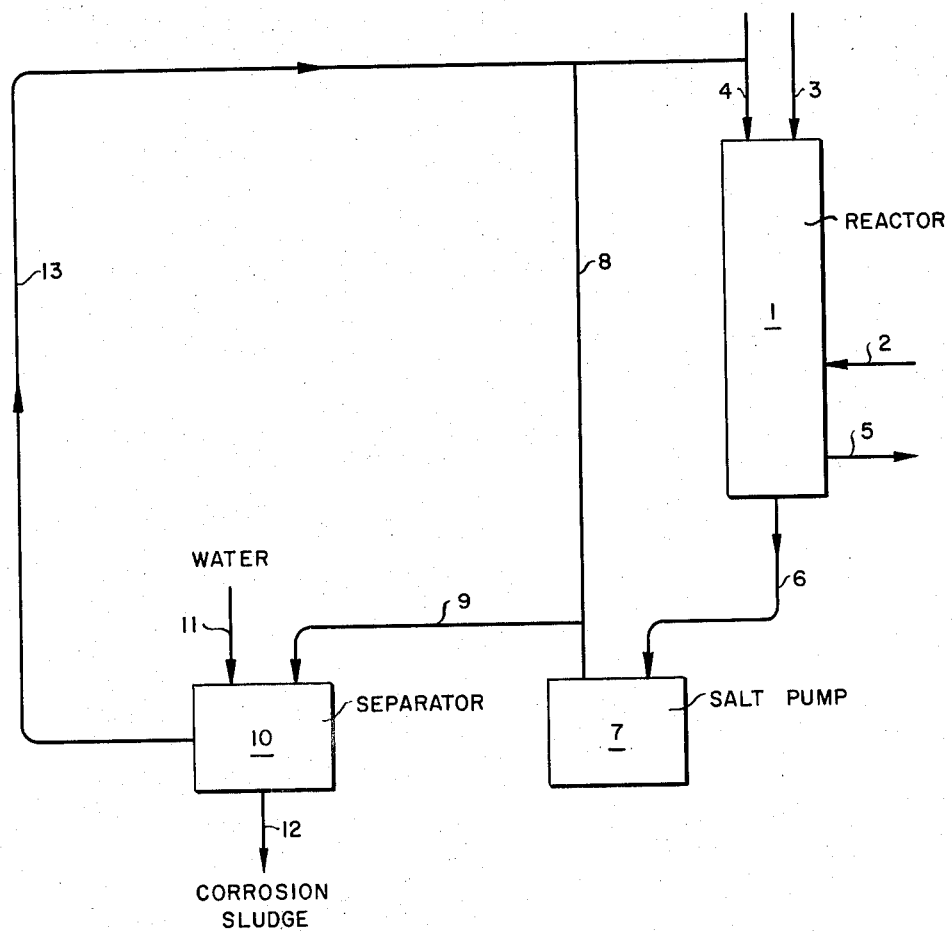

This invention relates to a process for the iodinative dehydrogenation of hydrocarbons.

Maxwell Nager, in U.S. 3,080,435, proposes to dehydrogenate organic compounds by a process involving: (1) iodinative dehydrogenation of an organic compound by reaction with elemental iodine in a molten metal iodide environment to produce a dehydrogenative compound and hydrogen iodide, (2) immediately reacting the produced hydrogen iodide with the corresponding metal oxide or hydroxide in the dehydrogenation zone to produce metal iodide, and (3) regenerating elemental iodine from the metal iodide, either in the dehydrogenation zone or in a separate oxidation zone, by reacting oxygen with the molten metal iodide. The use of lithium iodide as the metal iodide is particularly useful for the process. As the iodinative dehydrogenation reaction progresses, other reactions occur to some extent with the formation of coke and other non-volatile carbonaceous materials as well as insoluble corrosion debris such as ferric or chromium oxides (originating from the steel construction materials) or the double oxides thereof with lithium. These materials not only tend to interfere with the operation of the reactor by clogging and corroding the apparatus, but also remain suspended in the molten lithium iodide/oxide/hydroxide, thereby decreasing its effectiveness.

It is therefore, a principal object of this invention to provide an improved process for iodinative dehydrogenation utilizing a molten lithium iodide/oxide/hydroxide system which is purified of insoluble contaminants in a continuous or intermittent manner.

Other objects will appear from the description of the invention which will be made with reference to the accompanying drawing wherein:

The sole figure is a simplified flow diagram illustrating a preferred mode of practicing the invention.

Now, in accordance with the present invention, it has been found that the undesirable by-products formed during iodinative dehydrogenation of organic compounds with free iodine in the presence of molten lithium iodide/oxide/hydroxide and retained with the resulting molten lithium iodide/oxide/hydroxide can be separated therefrom easily and economically by running a slip stream of the molten material into a body of water, separating the solids from the aqueous solution and delivering the aqueous solution to the dehydrogenation system. In spite of the high temperature of the molten material, the solution process has proved to be unexpectedly simple in its operation. The lithium iodide, oxide and hydroxide are very soluble in water, so that they readily dissolve in the aqueous solution while the undesirable by-products, essentially water-insoluble, remain suspended or settle out. The undissolved impurities can be easily separated from the aqueous solution by conventional means such as settling, filtration and centrifugation, and the solution can then be passed into the iodine regeneration zone for return of the lithium iodide, oxide and hydroxide content thereof.

This purification process can be performed either continuously or periodically depending on the extent of the formation of the undesirable by-products.

Referring to the drawing, the embodiment represented therein is a simplified flow diagram depicting one method of carrying out the process. In the drawing, numeral 1 represents a regeneration-dehydrogenation reactor suitably packed with inert gas-liquid contacting elements and having a hydrocarbon inlet line 2 at about the midpoint thereof and a gas inlet line 3 for oxygen-containing gas at its upper end. There is also a molten salt inlet line 4 located at the upper end thereof. Lithium iodide in the molten mass and oxygen react in the upper section of the reactor to liberate iodine and to form, with water, lithium oxide/hydroxide. The hydrocarbon to be dehydrogenated enters through inlet line 2 and is contacted by the molten material and iodine vapors flowing down through the reactor and is dehydrogenated in the lower section of the reactor. The gaseous product stream is removed near the bottom, through line 5 while the molten material is removed through line 6 and returned via a salt pump 7 and line 8 to the top of the reactor through line 4. A portion of the molten material is withdrawn from line 8 through line 9 and mixed with water in separator 10 supplied by line 11. The undesirable water-insoluble by-products are removed via line 12. The lithium iodide/oxide/hydroxide solution is withdrawn via line 13 and passed through line 4 to the reactor. This lithium iodide/oxide/hydroxide solution could also be used as the absorbent in a scrubber to absorb hydrogen iodide from any product stream containing hydrogen iodide produced by hydrogenation of organic iodides contained in the product stream; such a recycle is more fully disclosed in applicant's copending U.S. application Serial No. 383,087 filed July 16, 1964.

Details as to the relative sizes, shapes and placement of the pieces of equipment and provisions for gas compressors, valves, baffles, fluid seals and the like are omitted for clarity since they will be readily supplied by those skilled in the relevant art.

The portion of molten salt which is passed into the aqueous solution can vary over the range of 0.01% to 10% depending on the amount of impurities present. This apportionment can be by any number of methods including an appropriate timing device, hydrocyclones, or other means all of which will be apparent to those with skill in the relevant art. Of course, it is also possible, during a shut-down, to clean up the whole or any portion of the salt-charge in this manner. The amount of aqueous solution required to dissolve the lithium salt varies from 0.1 to 10 pounds of water per pound of lithium salt, a more effective range being from 1 to 5 pounds of water per pound of lithium salt, with about 2 pounds of water per pound of salt being preferred. This of course can also be varied depending on the amount of water needed to replace that consumed in the reaction zone.

The temperatures at which the hydrocarbons are dehydrogenated and iodine is regenerated are usually in the range of 300° C.–700° C., preferably 400° C.–600° C. In certain cases temperatures lower than 300° C. may, however, also lead to favorable results, particularly in the regeneration reaction, e.g., 150° C.–300° C. The pressure employed may be atmospheric, although higher or lower pressures may also be used.

The organic material being dehydrogenated in the molten system utilized in the practice of this invention may be any of those disclosed in U.S. 3,080,435.

The following specific example of the invention will serve to illustrate more clearly the application of the invention, but it is not to be construed as in any manner limiting the invention.

From a reactor containing 200 pounds of fused lithium iodide/oxide/hydroxide salt, a slip stream of 5 pounds of the fused salt containing 0.5% by weight of insoluble contaminants were dropped into a vessel containing 10 pounds of water at room temperature and filtered. No insoluble contaminants could be detected in the clean salt solution returned to the reactor.

Additional fused salt containing as high as 1.0% of insoluble contaminants was treated in a similar manner. The amount of insoluble contaminants was reduced to below detectable limits.

I claim as my invention:

1. In a process for the dehydrogenation of a first hydrocarbon to at least a second hydrocarbon having a higher carbon-to-hydrogen ratio, wherein the first hydrocarbon and a reactive iodine species are reacted at a temperature in excess of 200° C., in a molten salt environment, comprising lithium iodide, and wherein oxygen is injected into the molten lithium iodide thereby oxidatively liberating iodine from the lithium iodide, the improvement comprising removing water-insoluble by-products and contaminants from used molten salt by mixing a portion of the molten salt with liquid water, separating the insoluble solid material from the resulting aqueous solution, returning the lithium and iodine content as aqueous solution to the oxidation zone for liberation of iodine.

2. A process in accordance with claim 1 wherein the slip stream is intermittently quenched with the aqueous solution.

3. A process in accordance with claim 1 wherein the liquid water is present in a ratio of 1 to 5 pounds per pound of molten salt.

4. A process in accordance with claim 1 wherein the liquid water is present in a ratio of 2 pounds per pound of molten salt.

5. A process in accordance with claim 1 wherein the molten salt is passed through a hydrocyclone and the heavier portion separated therein mixed with the liquid water.

References Cited by the Examiner
UNITED STATES PATENTS
3,080,435   3/1963   Nager _____ 260—673.5

DELBERT E. GANTZ, *Primary Examiner.*

G. E. SCHMITKONS, *Assistant Examiner.*